United States Patent
Benveniste

(10) Patent No.: US 7,539,168 B2
(45) Date of Patent: May 26, 2009

(54) EMERGENCY CALL HANDLING IN CONTENTION-BASED WIRELESS LOCAL-AREA NETWORKS

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 858 days.

(21) Appl. No.: 10/674,230

(22) Filed: Sep. 29, 2003

(65) Prior Publication Data

US 2004/0151144 A1 Aug. 5, 2004

Related U.S. Application Data

(60) Provisional application No. 60/444,196, filed on Feb. 3, 2003.

(51) Int. Cl.
*H04J 3/08* (2006.01)
(52) U.S. Cl. ............... 370/336; 370/326; 370/322; 370/329
(58) Field of Classification Search .......... 370/252, 370/447, 336, 326, 322, 329
See application file for complete search history.

(56) References Cited

U.S. PATENT DOCUMENTS

| | | | |
|---|---|---|---|
| 4,866,709 A * | 9/1989 | West et al. ............ | 370/314 |
| 6,226,277 B1 | 5/2001 | Chuah | |
| 6,377,548 B1 | 4/2002 | Chuah | |
| 6,865,163 B1 * | 3/2005 | Bergenwall et al. ..... | 370/288 |
| 2003/0050015 A1 * | 3/2003 | Kelly et al. ............ | 455/67.4 |
| 2003/0053469 A1 * | 3/2003 | Wentink ............... | 370/412 |
| 2004/0151144 A1 * | 8/2004 | Benveniste ............ | 370/336 |
| 2004/0196864 A1 * | 10/2004 | Benveniste ............ | 370/462 |

OTHER PUBLICATIONS

U.S. Appl. No. 09/985,257, filed Nov. 7, 2002, Mathilde Benveniste.

* cited by examiner

*Primary Examiner*—Vincent P Harper
*Assistant Examiner*—Fred A Casca
(74) *Attorney, Agent, or Firm*—Chapin IP Law, LLC

(57) ABSTRACT

An apparatus and methods for handling emergency message frames (e.g., "911" call frames, etc.) sent by a station in a wireless local-area network are disclosed. The illustrative embodiment increases the probability with which an emergency message frame is accorded the highest quality-of-service by modifying one or more IEEE 802.11e parameters (e.g., back-off contention window length, Arbitration Inter-Frame Space [AIFS], etc.) for a station or access point that transmits an emergency message frame.

14 Claims, 8 Drawing Sheets

EMERGENCY CALL HANDLING IN CONTENTION-BASED WIRELESS LOCAL-AREA NETWORKS

CROSS-REFERENCE TO RELATED APPLICATIONS

This application claims the benefit of U.S. provisional patent application Ser. No. 60/444,196, filed on 3 Feb. 2003, entitled "Handling 911 Calls in a Wireless LAN," which is incorporated by reference.

FIELD OF THE INVENTION

The present invention relates to telecommunications in general, and, more particularly, to techniques for handling emergency calls in wireless local-area networks.

BACKGROUND OF THE INVENTION

FIG. 1 depicts a schematic diagram of a wireless local-area network 100 in the prior art, which comprises: access point 101, stations 102-1 through 102-N, wherein N is a positive integer, and hosts 103-1 through 103-N, interconnected as shown. Each station 102-$i$, wherein $i$ is a member of the set {1, 2, ... N}, enables host 103-$i$ (a device such as a notebook computer, personal digital assistant [PDA], tablet PC, etc.) to communicate wirelessly with other hosts in local-area network 100 via access point 101.

Stations 101-1 through 101-N and access point 102 transmit blocks of data, called frames, to each other, via a shared-communications channel such that if two or more stations (or an access point and a station) transmit frames simultaneously via the shared-communications channel, then one or more of the frames can become corrupted (resulting in a collision). Consequently, local-area networks typically employ protocols for ensuring that a station can gain exclusive access to the shared-communications channel for an interval of time in order to transmit frames.

The Institute of Electrical and Electronics Engineers (IEEE) 802.11 family of protocols for wireless local-area networks employs a variety of mechanisms for avoiding and recovering from such collisions. One such mechanism, the Distributed Coordination Function (DCF), is a contention-based access mechanism in which stations, including the access point, compete to gain exclusive access to the shared-communications channel, just as, for example, several children might fight to grab a telephone to make a call.

In accordance with the Distributed Coordination Function, each station with frames to transmit (including the access point) waits until the shared-communications channel has been idle for a pre-determined time interval before transmitting into the channel. (Stations detect whether the shared-communications channel is idle or busy via a carrier-sensing mechanism.) In IEEE 802.11e, a variation of 802.11 that provides quality-of-service (QoS), frames are assigned to different traffic categories, and the length of time that a station waits before transmitting a frame into the channel, called the Arbitration Interframe Space (AIFS), depends on the traffic category to which the frame belongs.

After a station, including the access point, determines that the shared-communications channel has been sufficiently idle, the station selects a random time slot in which to transmit frames from a back-off contention window (sometimes referred to simply as a back-off window or a contention window). If two or more stations select the same time slot in the back-off contention window, then a collision occurs. When a transmitting station detects the collision, the station repeats the back-off procedure with a new, larger contention window (limited to a maximum size) and re-transmits the frames accordingly. By expanding the contention window after a collision, the probability that two or more stations will select the same time slot, and therefore experience another collision, is reduced.

SUMMARY OF THE INVENTION

The present invention enables the expeditious handling of emergency message frames (e.g., 911 voice-over-IP [VoIP] frames, etc.) sent by a station that communicates via a shared-communications channel. In particular, the illustrative embodiment increases the probability with which an emergency message frame is accorded the highest quality-of-service by modifying one or more parameters (e.g., back-off contention window length, Arbitration Inter-Frame Space [AIFS], etc.) for a station or access point that transmits an emergency message frame.

An important feature of the illustrative embodiment of the present invention is that it does not interfere in any way with the assignment of priorities to frames. Thus, a station can assign the highest-priority access category to frames that are not part of an emergency message. In addition, the illustrative embodiment requires only minor changes to existing IEEE 802.11e stations and access points (e.g., temporary modification of a parameter value when a station makes an emergency call, etc.).

In the illustrative embodiment, three techniques are employed for increasing the probability with which an emergency message frame is accorded the highest quality-of-service. First, the back-off contention window for a station that has an emergency message frame to transmit (henceforth referred to as an "emergency station") is always shorter than the back-off contention window of a station or access point competing to transmit non-emergency frames. Thus, the length of the back-off contention window for an emergency station is always less than CWmin[AC], the minimum back-off contention window length for access category AC, for every access category AC. This technique effectively increases the probability that the emergency station will draw the earliest time slot for transmitting frames into the shared-communications channel.

Second, if the back-off procedure results in a collision between an emergency station and another station (i.e., both stations select the same time slot), the emergency station shortens the length of its back-off contention window in the next iteration of back-off contention (down to some pre-determined minimum length). (Alternatively, in some embodiments of the present invention, the length of the back-off contention window for an emergency station might remain constant, or increased to a lesser degree than non-emergency stations, for subsequent iterations.) This second technique further increases the probability that the emergency station will draw the earliest time slot in each subsequent iteration of the back-off procedure, while maintaining the reduced probability of collision at each subsequent iteration due to the non-emergency stations' lengthening of their back-off contention windows in accordance with IEEE 802.11.

Third, for an emergency station the Arbitration Inter-Frame Space (AIFS) parameter is set to the same value as the Point Coordination Inter-Frame Space (PIFS) parameter, thereby enabling the emergency station to contend for the shared-communications channel (a) on an "equal footing" with an access point attempting to initiate HCF polling, and (b) with a timing advantage over non-emergency stations. Any collisions between an emergency station and an access point can be handled in accordance with the above second technique.

Although the illustrative embodiment of the present invention is disclosed in the context of IEEE 802.11 local-area networks, and in particular IEEE 802.11e local-area networks, it will be clear to those skilled in the art how to make and use embodiments of the present invention for other kinds of networks and network protocols. In addition, for the purposes of this specification, the term "call," while normally used only in the context of telephones, will be used to encompass all manners of communication (e.g. email, text chat, video, etc.), and it will be clear to those skilled in the art how to make and use embodiments of the present invention for such alternative means of communication.

The illustrative embodiment comprises: selecting one of a plurality of time slots in a back-off contention window; and transmitting a frame via a shared-communications channel at the selected time slot; wherein the length of the back-off contention window is based on the destination of said frame.

DETAILED DESCRIPTION

Figure 1:
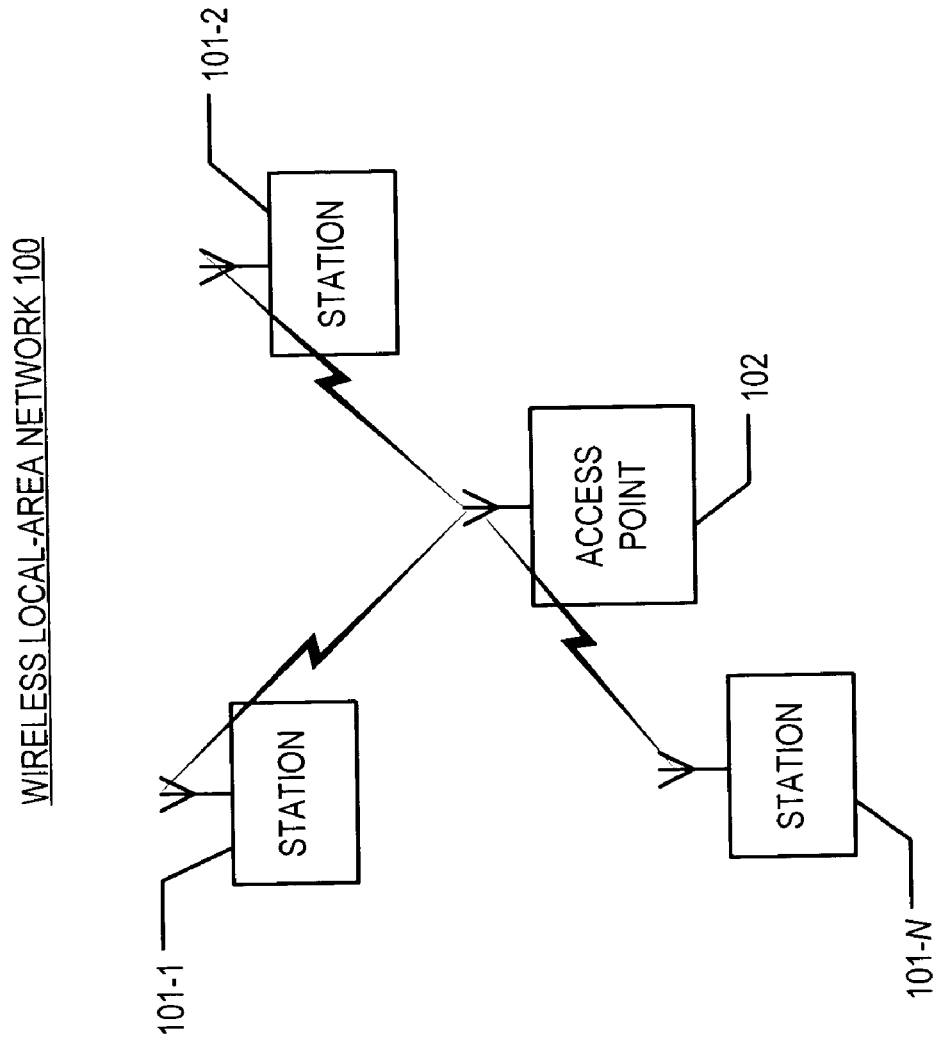
FIG. 1 depicts a schematic diagram of an exemplary wireless local-area network 100 in the prior art.
Figure 2:
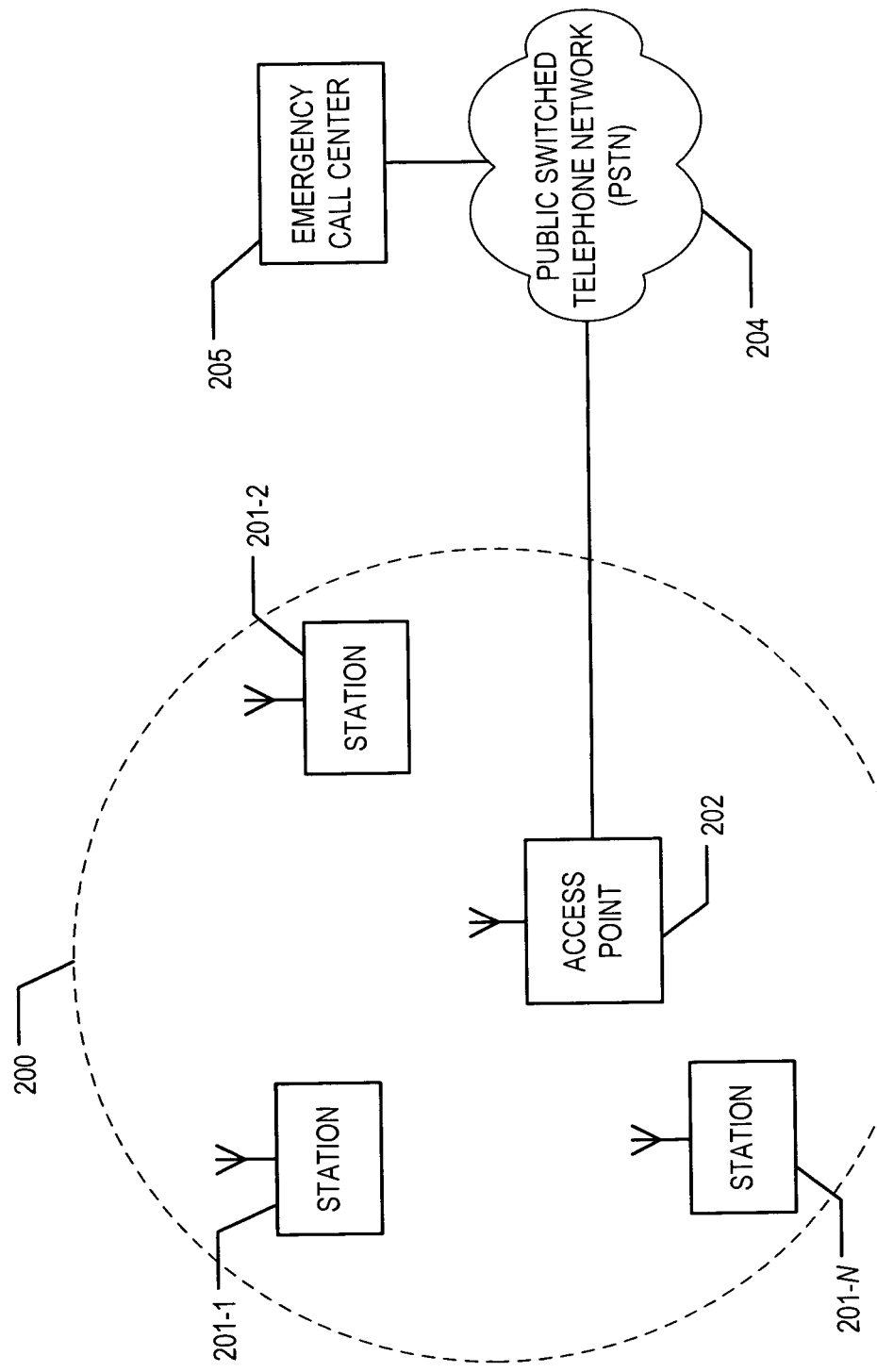
FIG. 2 depicts a schematic diagram of exemplary wireless local-area network 100, as shown in FIG. 1, connected to emergency call center 205 via Public Switched Telephone Network (PSTN) 204, in accordance with the illustrative embodiment of the present invention.

FIG. 2 depicts a schematic diagram of exemplary wireless local-area network 200 connected to emergency call center 205 via Public Switched Telephone Network (PSTN) 204, in accordance with the illustrative embodiment of the present invention. Wireless local-area network 200 comprises stations 201-1, 201-2, and 201-3, and access point 202. As shown in FIG. 2, access point 202 and emergency call center 205 are connected to Public Switched Telephone Network (PSTN) 204 in well-known fashion (e.g., via a wireline link, wireless link, public branch exchange [PBX], intermediary server, etc.).

Figure 3:
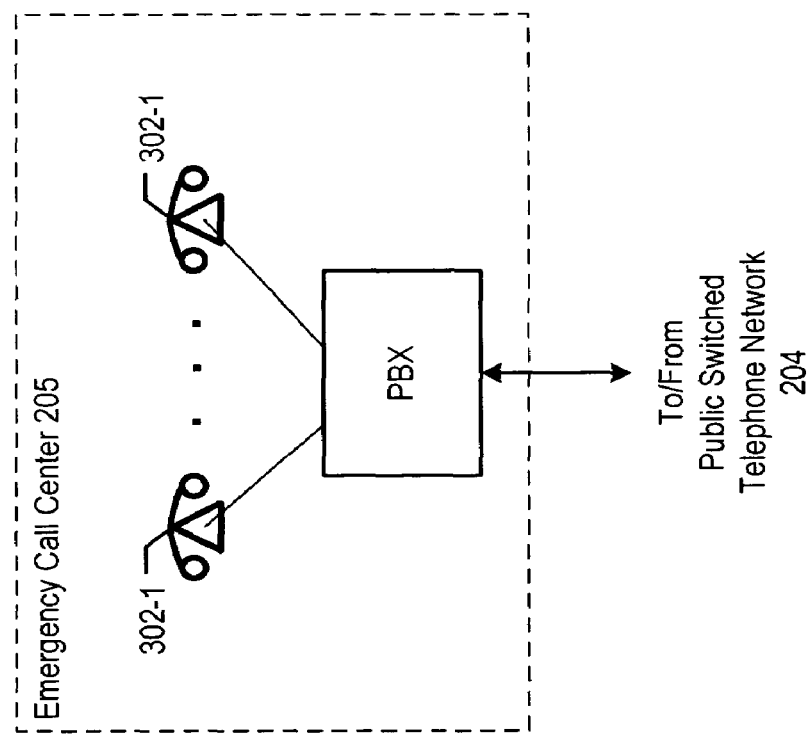
FIG. 3 depicts a block diagram of the salient components of emergency call center 205, as shown in FIG. 2.

FIG. 3 depicts a block diagram of the salient components of exemplary emergency call center 205. As shown in FIG. 3, emergency call center 205 comprises public branch exchange (PBX) 301, and operator telephones 302-1 through 302-N, interconnected as shown.

Figure 4:
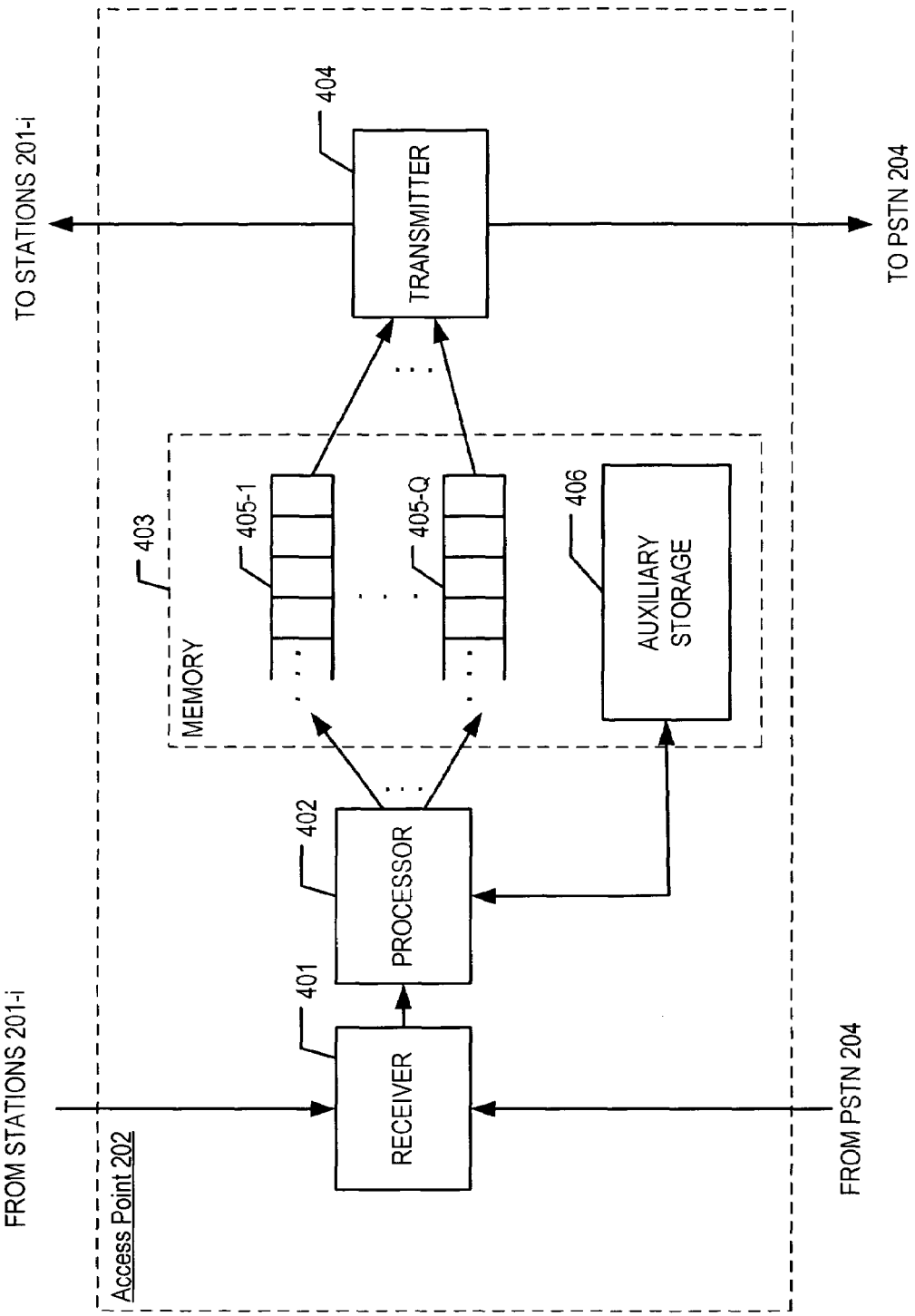
FIG. 4 depicts a block diagram of the salient components of access point 202, as shown in FIG. 1, in accordance with the illustrative embodiment of the present invention.

FIG. 4 depicts a block diagram of the salient components of access point 102 in accordance with the illustrative embodiment of the present invention. Access point 102 comprises: receiver 401, processor 402, memory 403, and transmitter 404, interconnected as shown.

As shown in FIG. 4, receiver 401 receives (i) IEEE 802.11 frames from stations 201-$i$ and (ii) digital telephony signals from Public Switched Telephone Network (PSTN) 204, in well-known fashion, and forwards these data to processor 402. As will be appreciated by those skilled in the art, in some embodiments of the present invention receiver 401 might comprise a single radio for receiving both (i) and (ii) in accordance with IEEE 802.11, while in some other embodiments receiver 401 might comprise a radio for receiving (i) and separate means (e.g., Ethernet network interface card, etc.) for receiving (ii). It will also be appreciated by those skilled in the art that in some embodiments an intermediary (e.g., server, voice-over-IP [VoIP] processor, etc., not shown in FIG. 4) might receive digital telephony signals from PTSN 204, process the signals, and transmit the processed signals to receiver 401 in well-known fashion.

Processor 402 is a general-purpose processor that is capable of executing instructions stored in memory 403, of reading data from and writing data into memory 403, of generating frames, and of executing the tasks described below and with respect to FIGS. 7 and 8, described below. In some alternative embodiments of the present invention, processor 402 is a special-purpose processor (e.g., a network processor, etc.). In either case, it will be clear to those skilled in the art, after reading this disclosure, how to make and use processor 402.

Memory 403 stores data and executable instructions, as is well-known in the art, and might be any combination of random-access memory (RAM), flash memory, disk drive, etc. As shown in FIG. 4, memory 403 comprises queues 405-$i$ for i=1 to Q, wherein Q is a positive integer, and auxiliary storage 406.

Each queue 405-$i$ corresponds to a respective traffic access category denoted "AC-$i$", and Q is the total number of access categories (e.g., 8, etc.) in access point 202's implementation of IEEE 802.11e. Although the IEEE 802.11e specification does not specify relative priorities for access categories, in this specification AC-1 has the highest priority, AC-2 has the second highest priority, etc. It will be clear to those skilled in the art how to make and use embodiments of the present invention in which some other priority ordering is employed.

As is well-understood in the art, processor 402 generates frames and transmits both:

(i) generated frames, and
(ii) frames received from receiver 401 to transmitter 404 via queues 405-1 through 405-Q based on access category, thereby providing prioritized quality-of-service (QoS).

Auxiliary storage 406 stores other data and executable instructions for processor 402 with respect to FIGS. 7 and 8, as described below.

Transmitter 404 removes frames in prioritized order from queues 405-1 through 405-Q, as described below in FIG. 8, and transmits the frames to stations 201-$i$ and Public Switched Telephone Network (PSTN) 204, as appropriate, in well-known fashion. As will be appreciated by those skilled in the art, in some embodiments transmitter 404 might comprise a single radio for transmitting to both stations 201-$i$ and PSTN 204 in accordance with IEEE 802.11, while in some other embodiments transmitter 404 might comprise a radio for transmitting frames to stations 201-$i$, and separate means (e.g., Ethernet network interface card, etc.) for transmitting telephony-based frames (e.g., signaling frames, voice frames, etc.) to PSTN 204. It will also be appreciated by those skilled in the art that in some embodiments an intermediary (e.g., server, voice-over-IP [VoIP] processor, etc., not shown in FIG. 4) might receive telephony-based frames from transmitter 404 process the frames, and transmit corresponding digital signals (e.g., IP packets, etc.) to PTSN 204, in well-known fashion.

Figure 5:
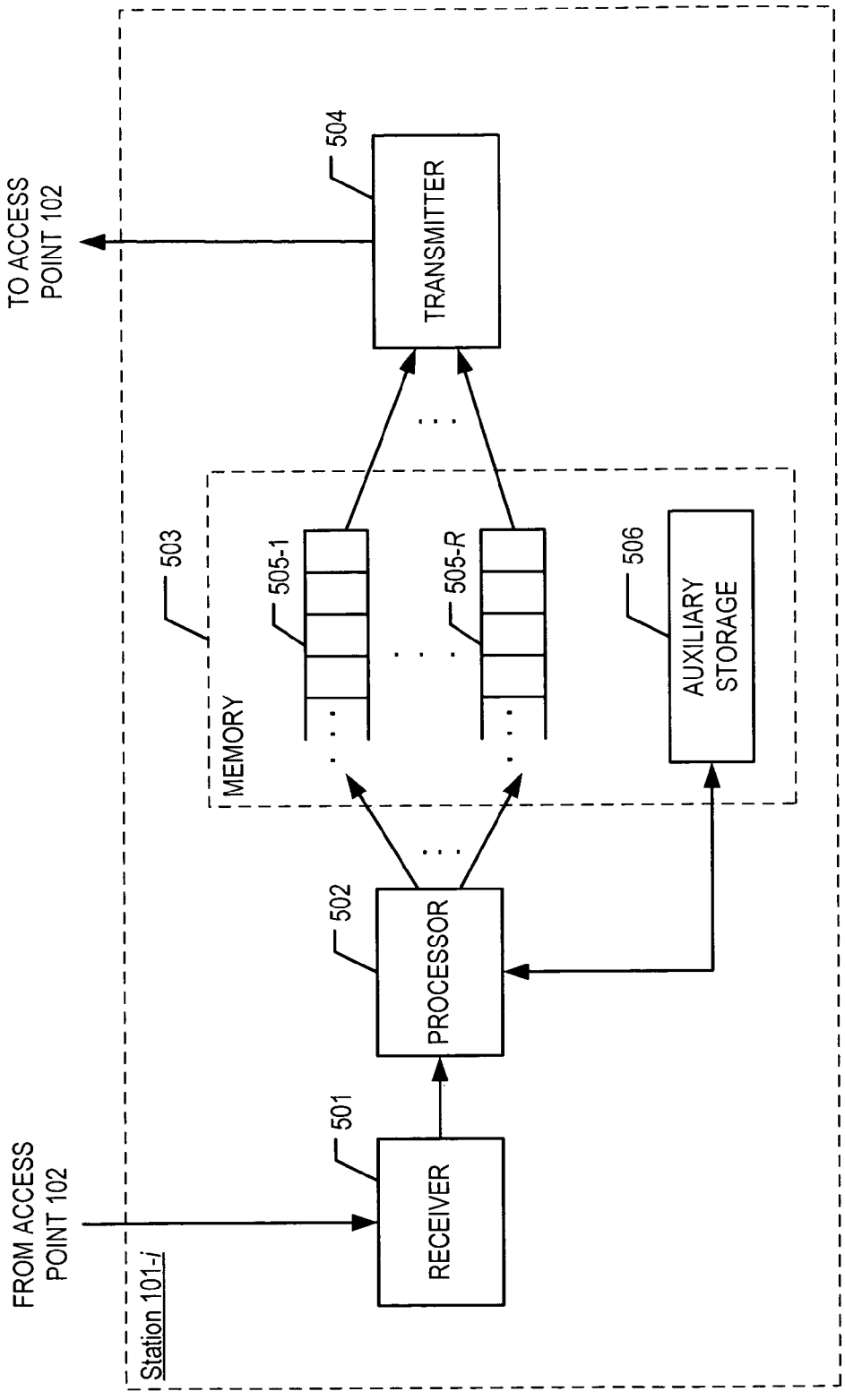
FIG. 5 depicts a block diagram of the salient components of station 201-$i$, as shown in FIG. 1, in accordance with the illustrative embodiment of the present invention.

FIG. 5 depicts a block diagram of the salient components of station 201-$i$, in accordance with the illustrative embodiment of the present invention. Station 201-$i$ comprises: receiver 501, processor 502, memory 503, and transmitter 504, interconnected as shown.

As shown in FIG. 5, receiver 501 receives IEEE 802.11 frames wirelessly from access point 202 or another station 201-$j$, in well-known fashion, and forwards the frames to processor 502. It will be clear to those skilled in the art how to make and use embodiments of receiver 501.

Processor 502 is a general-purpose processor that is capable of executing instructions stored in memory 503, of reading data from and writing data into memory 503, of generating frames, and of executing the tasks described below and with respect to FIGS. 8 and 9, described below. In some alternative embodiments of the present invention, processor 502 is a special-purpose processor (e.g., a network processor, etc.). In either case, it will be clear to those skilled in the art, after reading this disclosure, how to make and use processor 502.

Memory 503 stores data and executable instructions, as is well-known in the art, and might be any combination of random-access memory (RAM), flash memory, disk drive, etc. As shown in FIG. 5, memory 503 comprises queues 505-$i$ for i=1 to R, wherein R is a positive integer, and auxiliary storage 506.

Each queue 505-$i$ corresponds to respective traffic access category AC-$i$, as described above, and R is the total number of access categories (e.g., 8, etc.) in station 201-$i$'s implementation of IEEE 802.11e. As is well-understood in the art, processor 502 generates frames and forwards the frames to transmitter 404 via queues 505-1 through 505-R based on access category, thereby providing prioritized quality-of-service (QoS).

Auxiliary storage 506 stores other data and executable instructions for processor 502 with respect to FIGS. 7 and 8, as described below.

Transmitter 504 removes frames in prioritized order from queues 505-1 through 505-R, as described below in FIG. 8, and transmits the frames in accordance with IEEE 802.11 in well-known fashion. It will be clear to those skilled in the art how to make and use embodiments of transmitter 504.

Figure 6:
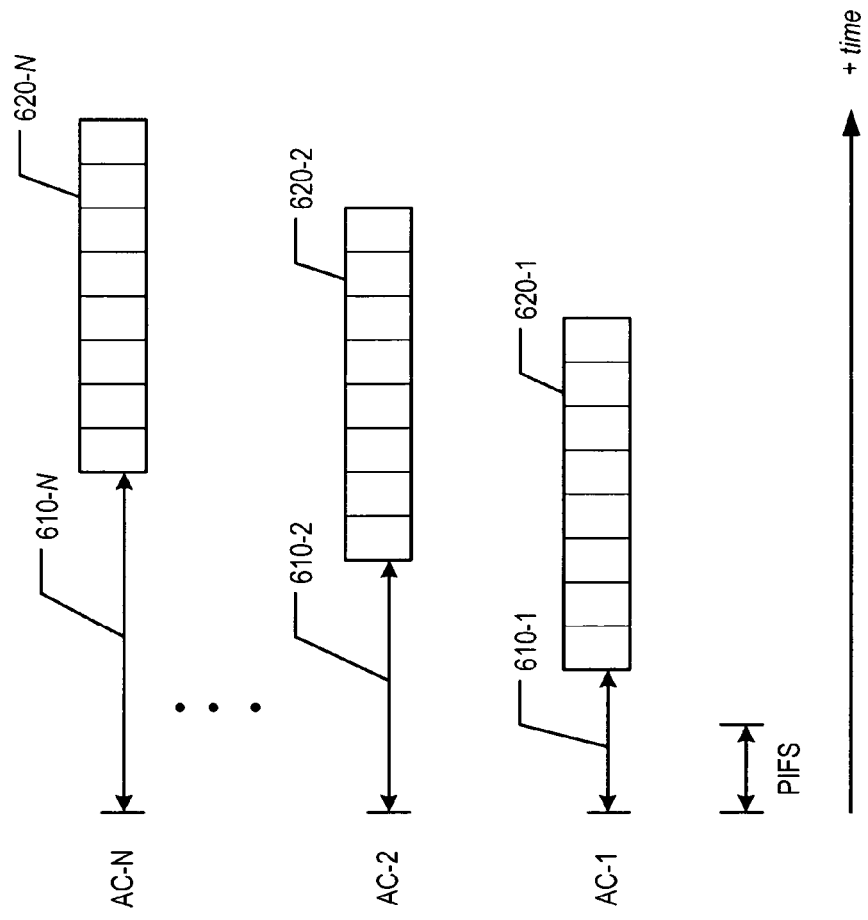
FIG. 6 depicts an exemplary timing diagram of contention-based access in accordance with IEEE 802.11e.

FIG. 6 depicts an illustrative timing diagram of contention-based access in accordance with IEEE 802.11e. Each access category AC-$i$ has (i) respective Arbitration Inter-Frame Space (AIFS) time interval 610-$i$ that, as is well-known in the art, defines how long the shared-communications channel must be idle before a station attempts to transmit a frame belonging to that access category; and (ii) back-off contention window 620-$i$, which, as is well-known in the art, has minimum size CWmin[AC-$i$] and maximum size CWmax[AC-$i$]. As shown in FIG. 6, the AIFS for a first access category AC-$i$ is less than the AIFS for a second access category AC-$j$ if and only if access category AC-$i$ has a higher priority than access category AC-$j$ (i.e., if and only if i<j). Furthermore, as shown in FIG. 6, the AIFS for the highest-priority access category AC-1 is greater than the Point Coordination Inter-Frame Space (PIFS), which, as is well-known in the art, specifies how long the shared-communications channel must be idle before access point 102 initiates the Hybrid Coordination Function (HCF).

Figure 7:
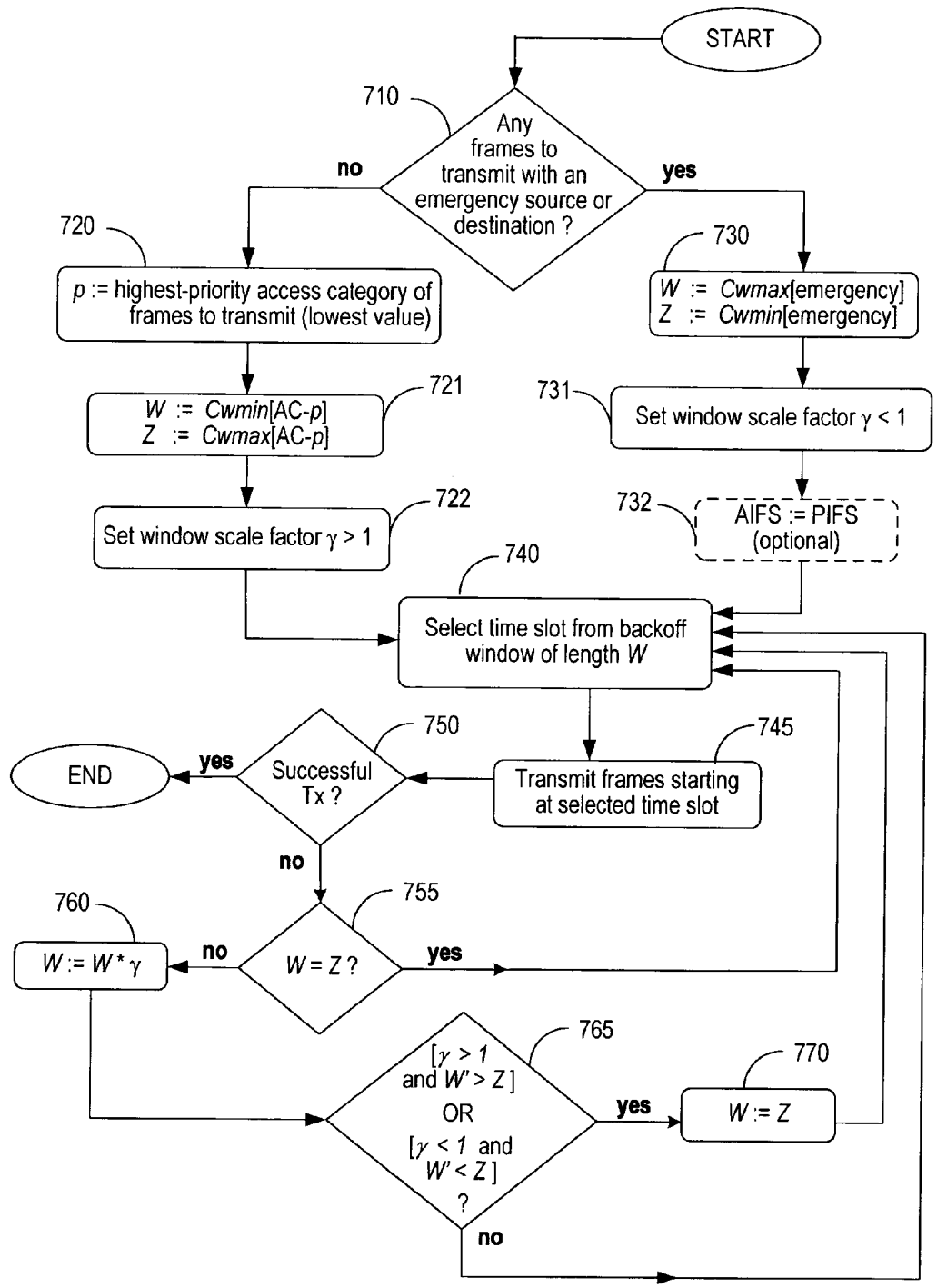
FIG. 7 depicts a flowchart of contention-based access for a station 201-$i$ or access point 202, in accordance with the illustrative embodiment of the present invention.

FIG. 7 depicts a flowchart of contention-based access for station 201-$i$ or access point 202, in accordance with the illustrative embodiment of the present invention. It will be clear to those skilled in the art which tasks depicted in FIG. 7 can be performed simultaneously or in a different order than that depicted.

At task 710 for station 201-$i$, the station determines whether there are any frames in queues 505-1 through 505-R that have an emergency call center as a destination. For the case of access point 202, the access point determines whether there are any frames in queues 405-1 through 405-Q that have an emergency call center as either a destination or a source. If any such emergency frames are found, execution proceeds to task 730; otherwise, execution continues at task 720.

As will be appreciated by those skilled in the art, the determination of task 710 (for both station 201-$i$ and access point 202) can be performed in a variety of ways. In some embodiments of access point 202, processor 402 might check the destination and source fields of each frame in queues 405-1 through 405-Q for a match against a list of emergency call center identifiers (e.g., IP addresses, telephone numbers, etc.). In some other embodiments, processor 402 might check only queue 405-1, since, presumably, an emergency transmission would be of the highest priority (i.e., belong to access category AC-1). In still some other embodiments, an extra queue (called, say, 405-0) might be provided to buffer emergency frames separately.

Similarly, in some embodiments of station 201-$i$, processor 502 might check the destination of each frame in queues 505-1 through 505-R for a match against a list of emergency call center identifiers. In some other embodiments, processor 502 might check only queue 505-1, since, as noted above, an emergency transmission would be of the highest priority (and in fact, a user typically is not attempting any other communications during an emergency call). In still some other embodiments, an extra queue 505-0 might be provided to buffer emergency frames separately.

At task 720, variable p is set to the index of the highest-priority queue with at least one frame (i.e., queue 405-$p$ for access point 202, and 505-$p$ for station 201-$i$). Execution proceeds to task 725.

At task 721, variable W is set to Cwmin[AC-p] and variable Z is set to Cwmax[AC-p]. W stores the initial length of the back-off contention window, and Z represents the final length of the back-off contention window when the window is repeatedly expanded due to consecutive collisions.

At task 722, variable γ, the back-off window scale factor, is set to a constant greater than one. Scale factor γ determines the extent to which the back-off window is expanded after a collision (for example, γ=2 implies that the length of the window is doubled after each collision, up to maximum length Cwmax[AC-p]). After completion of task 722, execution proceeds to task 740.

At task 730, variable W, the initial length of the back-off contention window, is set to Cwmax[emergency], the maximum window size for frames from/to an emergency call center, and variable Z, the final size of the back-off window after repeated collisions, is set to Cwmin[emergency], the minimum window size for frames from/to an emergency call center. In the illustrative embodiment of the present invention, Cwmax[emergency] is defined to be less than Cwmin[AC-p] for all access categories AC-p. As explained in the summary, this effectively increases the probability that emergency station 201-*i* (or access point 202 with queued emergency frames) will draw the earliest time slot for transmitting its frames.

At task 731, back-off window scale factor γ is set to a constant less than one. Scale factor γ determines the extent to which the back-off window is contracted after a collision (for example, γ=0.5 implies that the length of the window is halved after each collision, down to minimum length Cwmin [AC-p]). As explained in the summary, contraction of the back-off window further increases the probability that emergency station 201-*i* (or access point 202 with queued emergency frames) will draw the earliest time slot for transmitting its frames in the next iteration of the back-off procedure.

At optional task 732, the Arbitration Inter-Frame Space (AIFS) is set to equal the Point Coordination Inter-Frame Space (PIFS), thereby enabling the emergency station to contend for the shared-communications channel (a) on an "equal footing" with an access point attempting to initiate HCF polling, and (b) with a timing advantage over all other stations that have non-emergency frames to transmit. As will be appreciated by those skilled in the art, in some embodiments tasks 730 and 731 might provide sufficiently advantageous handling of emergency calls such that task 732 is not required. After completion of task 732, execution proceeds to task 740.

At task 740, station 201-*i* or access point 202, as appropriate, randomly selects a time slot from a back-off window of length W in accordance with IEEE 802.11 in the prior art.

At task 745, station 201-*i* or access point 202, as appropriate, transmits queued frames starting at the selected time slot. A detailed flowchart for task 745 is disclosed in FIG. 8 below.

At task 750, station 201-*i* or access point 202, as appropriate, determines from the receipt of, or failure to receive, an acknowledgement whether the transmission of task 745 was successful or unsuccessful (e.g., due to a collision, etc.). If the transmission was unsuccessful, execution proceeds to task 755; otherwise, the method terminates.

At task 755, variable W is tested for equality with variable Z. If equal, execution continues at task 740 for a subsequent transmission attempt; otherwise, execution proceeds to task 760.

At task 760, W is set to the product of W and γ.

At task 765, station 201-*i* or access point 202, as appropriate, determines whether the scaling of of task 760 would cause the window length to cross threshold Z (i.e., whether W'>Z when γ>1 or W'<Z when γ<1). If so, execution proceeds to task 770; otherwise execution continues at task 740 for a subsequent transmission attempt.

At task 770, W is set to Z. After task 770, execution continues at task 740 for a subsequent transmission attempt.

Figure 8:
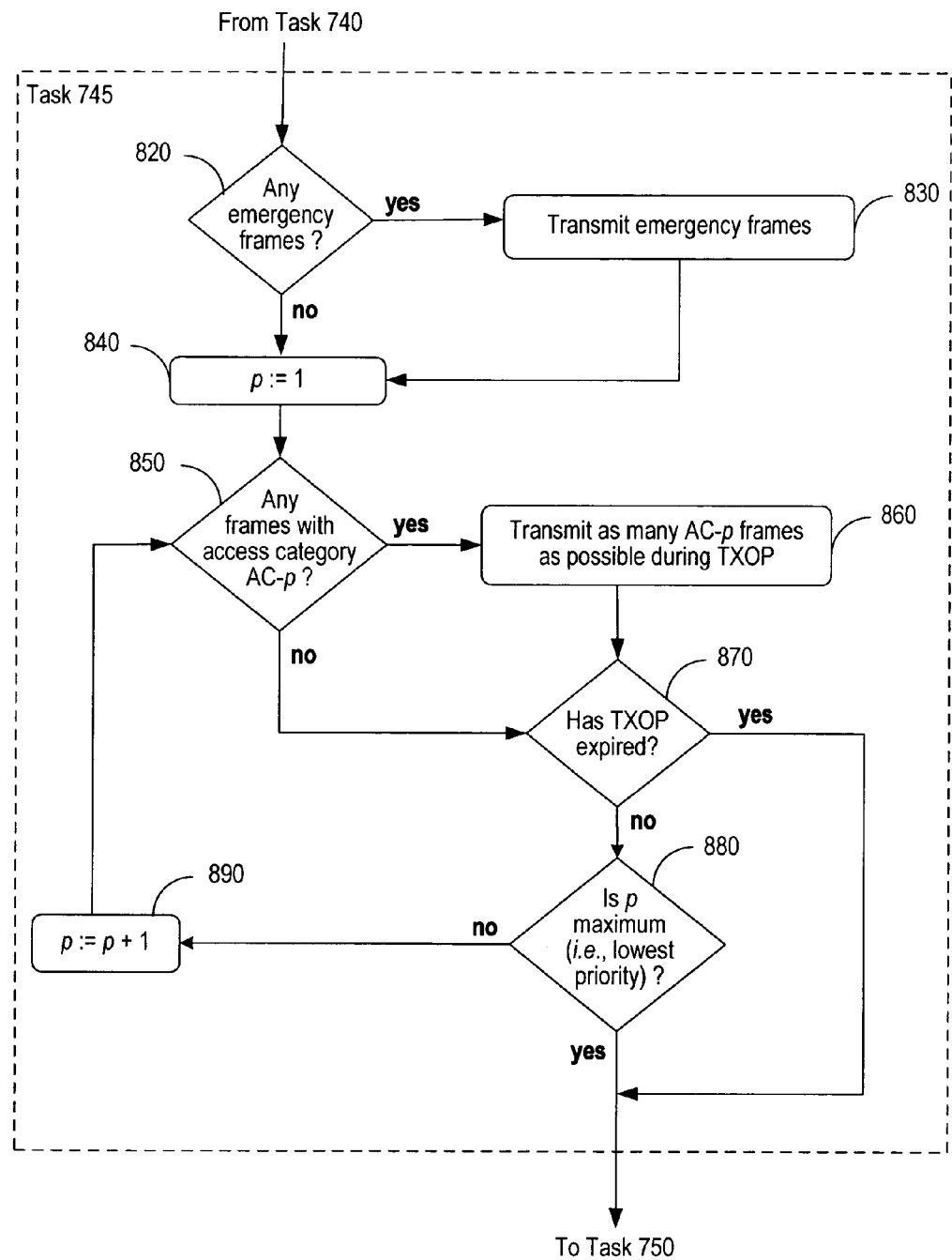
FIG. 8 depicts a detailed flowchart for task 745, as depicted in FIG. 7, in accordance with the illustrative embodiment of the present invention.

FIG. 8 depicts a detailed flowchart for task 745, as depicted in FIG. 7, in accordance with the illustrative embodiment of the present invention. It will be clear to those skilled in the art which tasks depicted in FIG. 8 can be performed simultaneously or in a different order than that depicted.

At task 820, station 201-*i* or access point 202, as appropriate, determines whether there are any emergency frames queued for transmission. (This determination was previously made at task 710, as described above, and therefore need not be repeated.) If so, execution continues at task 830; otherwise execution proceeds to task 840.

At task 830, the emergency frames are transmitted.

At task 840, access category index variable p is initialized to 1.

At task 850, queue 405-*p* (or 505-*p*, as appropriate) is checked for any frames. If there are one or more frames, execution proceeds to task 860; otherwise execution continues at task 870.

At task 860, as many frames in queue 405-*p* (or 505-*p*) are transmitted during the allotted transmission opportunity (TXOP) as possible.

Task 870 checks whether the transmission opportunity (TXOP) has expired. If so, execution proceeds to task 750; otherwise execution continues at task 880.

Task 880 determines whether p corresponds to the lowest-priority access category (i.e., AC-Q for access point 202, AC-R for station 201-*i*). If so, execution proceeds to task 750; otherwise execution continues at task 890.

At task 890, index p is incremented. After task 890, execution continues back to task 850.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   selecting, by a transmitter, one of a plurality of time slots in a back-off contention window; and
   transmitting a frame via a shared-communications channel at the selected time slot;
   wherein the length of said back-off contention window is based on the destination of said frame, such that when said destination of said frame matches an entry in a list of emergency call center identifiers, the length of the back-off contention window is set to a minimum value thereby increasing the probability that the transmitter of said frame will draw the earliest time slot for transmitting said frame.

2. The method of claim 1 wherein the length of said back-off contention window is less than K only when the destination of said frame is associated with an emergency call center, wherein K is a positive real number.

3. The method of claim 1 wherein said shared-communications channel is for wireless communications in a local-area network.

4. The method of claim 3 wherein said local-area network is an IEEE 802.11 local-area network, and wherein the length of said back-off contention window is less than Cwmin[AC] for every access category AC when the destination of said frame is associated with an emergency call center.

5. A method comprising:
   (a) determining when a shared-communications channel has been idle for a time interval; and
   (b) transmitting a frame via said shared-communications channel after said time interval;
   wherein the length of said time interval is based on the destination of said frame, such that when said destination of said frame matches an entry in a list of emergency call center identifiers, the length of the back-off contention window is set to a minimum value thereby increasing the probability that the transmitter of said frame will draw the earliest time slot for transmitting said frame.

6. The method of claim 5 wherein the length of said time interval is less than L only when the destination of said frame is associated with an emergency call center, wherein L is a positive real number.

7. The method of claim 6 wherein said shared-communications channel is for wireless communications in a local-area network.

8. The method of claim 7 wherein said local-area network is an IEEE 802.11 local-area network, and wherein the length of said time interval equals the Point Coordination Function Inter Frame Space when the destination of said frame is associated with an emergency call center.

9. The method of claim 5 further comprising:
   (c) selecting one of a plurality of time slots in a back-off contention window when (b) is unsuccessful; and
   (d) re-transmitting said frame via said shared-communications channel at the selected time slot;
   wherein the length of said back-off contention window is based on the destination of said frame.

10. An apparatus comprising:
    a processor for selecting one of a plurality of time slots in a back-off contention window; and
    a transmitter for transmitting a frame via a shared-communications channel at the selected time slot;
    wherein the length of said back-off contention window is based on the destination of said frame, such that when said destination of said frame matches an entry in a list of emergency call center identifiers, the length of the back-off contention window is set to a minimum value thereby increasing the probability that the transmitter of said frame will draw the earliest time slot for transmitting said frame.

11. The apparatus of claim 10 wherein the length of said back-off contention window is less than K only when the destination of said frame is associated with an emergency call center, wherein K is a positive real number.

12. The apparatus of claim 10 wherein said processor and said transmitter operate in accordance with an IEEE 802.11 specification, and wherein the length of said back-off contention window is less than Cwmin[AC] for every access category AC when the destination of said frame is associated with an emergency call center.

13. An apparatus comprising:
    a host computer for generating a data block; and
    a wireless terminal for:
       selecting one of a plurality of time slots in a back-off contention window; and transmitting a frame based on said data block via a shared-communications channel at the selected time slot;
       wherein the length of said back-off contention window is based on the destination of said frame, such that when said destination of said frame matches an entry in a list of emergency call center identifiers, the length of the back-off contention window is set to a minimum value thereby increasing the probability that the transmitter of said frame will draw the earliest time slot for transmitting said frame.

14. The apparatus of claim 13 wherein said wireless terminal operates in accordance with an IEEE 802.11 specification, and wherein the length of said back-off contention window is less than Cwmin[AC] for every access category AC when the destination of said frame is associated with an emergency call center.

* * * * *